United States Patent
Westendorf

(10) Patent No.: US 8,463,521 B2
(45) Date of Patent: Jun. 11, 2013

(54) VEHICLE DRIVER COACHING SYSTEM AND METHOD

(75) Inventor: Dirk Gavin Westendorf, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 595 days.

(21) Appl. No.: 12/646,699

(22) Filed: Dec. 23, 2009

(65) Prior Publication Data

US 2011/0153178 A1    Jun. 23, 2011

(51) Int. Cl.
*G05D 1/00* (2006.01)

(52) U.S. Cl.
USPC ...... 701/93; 701/1; 701/70; 701/96; 701/300; 340/439

(58) Field of Classification Search
USPC ................ 701/1, 70, 93, 96, 123, 300, 301, 701/302; 340/439
See application file for complete search history.

(56) References Cited

U.S. PATENT DOCUMENTS

| | | | |
|---|---|---|---|
| 5,495,251 A * | 2/1996 | Gilling et al. | 342/70 |
| 6,311,120 B1 * | 10/2001 | Asada | 701/96 |
| 6,324,465 B1 * | 11/2001 | Teramura et al. | 701/96 |
| 6,401,024 B1 * | 6/2002 | Tange et al. | 701/96 |
| 6,560,525 B1 | 5/2003 | Joyce et al. | |
| 6,708,099 B2 * | 3/2004 | Tellis et al. | 701/96 |
| 6,882,923 B2 * | 4/2005 | Miller et al. | 701/96 |
| 6,902,021 B2 | 6/2005 | Kikuchi et al. | |
| 7,259,661 B2 | 8/2007 | Kitterer et al. | |
| 7,280,903 B2 | 10/2007 | Arai et al. | |
| 7,454,962 B2 | 11/2008 | Nishiyama et al. | |
| 7,490,000 B2 * | 2/2009 | Siddiqui et al. | 701/104 |
| 7,925,414 B2 * | 4/2011 | Hellmann et al. | 701/96 |
| 8,014,928 B2 * | 9/2011 | Mills et al. | 701/96 |
| 8,024,102 B2 * | 9/2011 | Swoboda et al. | 701/96 |

(Continued)

FOREIGN PATENT DOCUMENTS

| | | | |
|---|---|---|---|
| JP | 2000020900 | | 1/2000 |
| JP | 2003267173 | | 9/2003 |
| JP | 2005289183 A | * | 10/2005 |
| JP | 2006076415 | | 3/2006 |
| WO | 2009031021 | | 3/2009 |

OTHER PUBLICATIONS

Kinoshita et al., Vehicular Display Device, Oct. 20, 2005, JPO, JP 2005-289183 A, English Abstract.*

(Continued)

*Primary Examiner* — Paul N Dickson
*Assistant Examiner* — James English
(74) *Attorney, Agent, or Firm* — Rankin, Hill & Clark LLP

(57) ABSTRACT

A driver coaching system for providing a recommended driver action during driving of a vehicle includes a distance measuring device of an adaptive cruise control (ACC) system for measuring a distance between a subject vehicle and a preceding vehicle, and a speed measuring device for measuring a speed of the subject vehicle. The driver coaching system further includes a coaching controller communicating with each of the distance measuring device and the speed measuring device. The coaching controller determines a recommended driver input based on the distance and speed as measured, respectively, by the distance measuring device and the speed measuring device. An output device is mounted in the subject vehicle and communicates the recommended driver input.

17 Claims, 3 Drawing Sheets

U.S. PATENT DOCUMENTS

| | | | |
|---|---|---|---|
| 8,046,146 B2 * | 10/2011 | Osborn et al. | 701/71 |
| 8,116,971 B2 * | 2/2012 | Chen et al. | 701/123 |
| 2002/0177935 A1 * | 11/2002 | Winner et al. | 701/93 |
| 2006/0224295 A1 * | 10/2006 | Tengler et al. | 701/96 |
| 2009/0043467 A1 * | 2/2009 | Filev et al. | 701/57 |
| 2009/0288636 A1 * | 11/2009 | Saito et al. | 123/399 |
| 2010/0030458 A1 * | 2/2010 | Coughlin | 701/123 |
| 2010/0198478 A1 * | 8/2010 | Shin | 701/96 |
| 2011/0210838 A1 * | 9/2011 | Fujiki et al. | 340/439 |

OTHER PUBLICATIONS

Kinoshita et al., Vehicular Display Device, Oct. 20, 2005, JPO, JP 2005-289183 A, Machine Translation of Description.*

* cited by examiner

VEHICLE DRIVER COACHING SYSTEM AND METHOD

BACKGROUND

Exemplary embodiments herein generally relate to a driver coaching system and method for a vehicle, and more particularly relate to a driver coaching system and method for providing a recommended driver action to a driver during driving of a vehicle.

Automated vehicle driver evaluation systems are known. For example, one known driver evaluation system for promoting fuel economy provides real time advice and instruction to a driver, such as regarding the driver's use of the brake pedal or accelerator pedal. Driver coaching systems are also known for providing advice regarding optimal operation of a brake pedal and/or an accelerator pedal to promote fuel economy. To provide improved fuel economy, one known driving assistance apparatus provides driver advice (e.g., messages on an information display or voice through a sound system of the vehicle) regarding vehicle operation based on the surrounding environment relative to the vehicle (e.g., traffic, construction, regulations, etc.) in addition to vehicle sensor information (e.g., vehicle speed, engine speed, accelerator position and brake position).

Separately, adaptive cruise control (ACC) systems for vehicles are known. These systems typically sense a distance to a forward or preceding vehicle and then control the subject vehicle (i.e., the vehicle equipped with the ACC system) so as to maintain a predetermined distance between the subject vehicle and the preceding vehicle. One known ACC system also provides a warning feature in which the system alerts the driver to intervene manually when the system determines that conditions are such that braking needs exceed the capabilities of the ACC system (e.g., the preceding vehicle has stopped or decelerated rapidly). In another known ACC system, the driver is prompted to brake if the extra braking that is needed is within the capability of the vehicle braking system; otherwise, the system issues a collision warning.

SUMMARY

In accordance with one aspect, a driver coaching system for a vehicle includes an adaptive cruise control (ACC) system for automatically controlling a vehicle speed of the vehicle. The ACC system includes a distance measuring device for measuring a distance between the vehicle and a preceding vehicle, and a speed measuring device for measuring a speed of the vehicle. The ACC system also includes an input device for inputting at least one of a target vehicle speed or a target distance, and an ACC controller that controls the vehicle speed of the vehicle based on the distance measured by the distance measuring device, the speed measured by the speed measuring device and the at least one of the target vehicle speed or the target distance inputted into the input device. A coaching controller communicates with the ACC system. The coaching controller is configured to determine a recommended driver input to optimize fuel economy based on the distance measured by the distance measuring device of the ACC system and the speed measured by the speed measuring device. The driver coaching system further includes an output device for communicating the recommended driver output to a driver of the vehicle.

In accordance with another aspect, a vehicle driver coaching method is provided. In the method according to this aspect, a distance between a subject vehicle and a preceding vehicle is measured using a distance measuring device of an adaptive cruise control (ACC) system. A speed of the subject vehicle is measured. A recommended driver input is determined to optimize fuel economy based on the distance measured by the measuring device of the ACC system and the speed measured. The recommended driver input is communicated to a driver of the subject vehicle.

In accordance with still another aspect, a driver coaching system for providing a recommended driver action during driving of a vehicle includes a distance measuring device of an adaptive cruise control (ACC) system for measuring a distance between a subject vehicle and a preceding vehicle, and a speed measuring device for measuring a speed of the subject vehicle. The driver coaching system further includes a coaching controller communicating with each of the distance measuring device and the speed measuring device. The coaching controller determines a recommended driver input based on the distance and speed as measured, respectively, by the distance measuring device and the speed measuring device. An output device is mounted in the subject vehicle and relays the recommended driver input.

DETAILED DESCRIPTION

Figure 1:
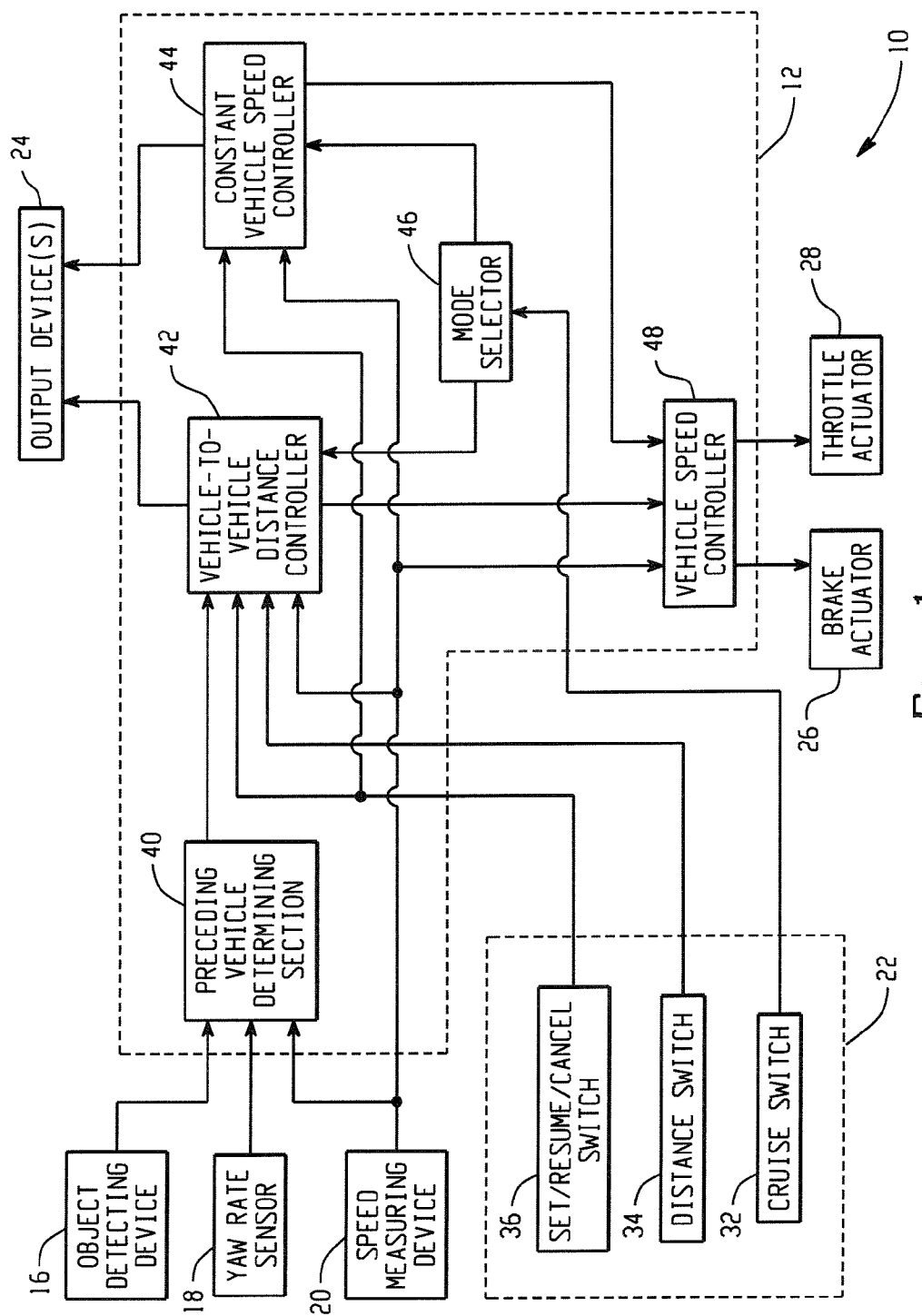
FIG. 1 is a block diagram schematically illustrating an adaptive cruise control (ACC) system having an object detecting or distance measuring device.

Referring now to the drawings, wherein the showings are for purposes of illustrating one or more exemplary embodiments and not for purposes of limiting same, FIG. 1 illustrates an exemplary adaptive cruise control (ACC) system 10 for automatically controlling a vehicle speed of a vehicle. The illustrated ACC system 10 includes an ACC controller 12, a plurality of detecting devices or sensors 16, 18, 20, an input device 22, one or more output devices 24, a brake actuator 26 and a throttle actuator 28. The plurality of detecting devices or sensors can include an object detecting or distance measuring device 16, a yaw rate sensor 18 and a vehicle speed measuring device 20. The device 16 can detect an object forward of the subject vehicle (i.e., the vehicle on which the ACC system 10 is mounted) and can measure a distance between the subject vehicle and the object detected, which can be a preceding vehicle. The device 16 can output a signal corresponding to the object detected and/or the distance measured to the ACC controller 12.

Figure 5:
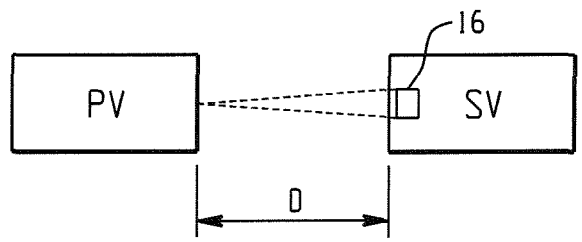
FIG. 5 is a schematic diagram showing a vehicle having the object detecting or distance measuring device detecting a preceding vehicle and measuring a distance thereto.

For example, with brief reference to FIG. 5, the object detecting or distance measuring device 16 can be mounted on the illustrated subject vehicle SV. Using radar, laser, etc., the device 16 can measure a distance D between the subject vehicle SV and an object detected forward of the subject vehicle SV, such as a preceding vehicle PV. In addition, the object detecting device 16 can be used by the ACC controller 12 to determine a velocity of approach of the subject vehicle SV relative to the preceding vehicle PV, and calculate the direction of the detected object or preceding vehicle PV.

The yaw rate sensor 18, which can be fitted near the rear axle of the subject vehicle SV, can be constructed from, for example, a piezoelectric element, a gyro sensor, or the like, for detecting the direction of the subject vehicle SV on a horizontal plane, the amount of change in the angle of gradient with respect to the vertical direction, and the like, and which measures the yaw-rate, which is the rotational angular speed around the vertical axis of the subject vehicle SV's center of gravity. The yaw rate sensor 18 can then output a signal corresponding to the size of the measured result to the ACC controller 12.

The vehicle speed measuring device 20 measures a speed of the subject vehicle SV. The speed measuring device 20 can then output a signal corresponding to the measured speed to the ACC controller 12. In one exemplary embodiment, the vehicle speed measuring device 20 includes a wheel speed sensor that measures wheel speed of the subject vehicle SV.

The input device 22 allows for inputting at least one of a target vehicle speed for the subject vehicle SV and/or a target distance to be maintained between the subject vehicle SV and a detected preceding vehicle PV. In an exemplary embodiment, the input device 22 is a cruise control switch which allows a driver of the subject vehicle SV to operate the ACC system 10. In the illustrated embodiment, the input device 22 configured as a cruise control switch includes a cruise switch 32, a distance switch 34 and a set/resume/cancel switch 36. The cruise switch 32 can function as an on/of switch for turning the ACC system 10 on and off. For example, the cruise switch 32 allows for switching between a control state in which either a vehicle-to-vehicle distance control function or a constant vehicle speed control function is operable and a non-control state in which both the vehicle-to-vehicle distance control function and the constant vehicle speed control function are disabled.

The distance switch 34 can be a switch for the driver to operate when the driver wants to set a vehicle-to-vehicle distance between the subject vehicle SV and the preceding vehicle PV. The set/resume/cancel switch 36 can be a switch for the driver to operate. For example, the driver could use switch 36 to set a constant vehicle speed, temporarily cancel the operation of the ACC system 10, and/or resume operation of the ACC system 10. Of course, this is but one arrangement for the cruise control switch and other suitable cruise control switches could be employed, as could alternate and/or additional input devices.

The brake actuator 26 can decelerate the subject vehicle SV by, for example, controlling the brake fluid pressure or the like. The brake actuator 26 operates based on a control signal sent by the ACC controller 12. The throttle actuator 28 can accelerate or decelerate the subject vehicle SV by, for example, controlling the opening level of a throttle on the subject vehicle SV. Like the brake actuator 26, the throttle actuator 28 operates based on a control signal sent from the ACC controller 12. The output devices 24 can include, for example, one or more of a display device, a speaker, light indicators, or the like, fitted to an installment panel of the subject vehicle SV. The output device or devices 24 can output various data, warnings, and the like based on control signals sent from the ACC controller 12. Such output could include, for example, display messages, light indicators, sounds, warning sounds, or the like.

The ACC controller 12 can comprise a central processing unit (CPU), a read-only memory (ROM) for storing a control program and control data, and a random access memory (RAM) for providing a processing/working area for the CPU in storing various control data temporarily, though none of these items are illustrated in FIG. 1. As shown, the illustrated ACC controller 12 can comprise a preceding vehicle determining section or module 40, a vehicle-to-vehicle distance controller 42, a constant vehicle speed controller 44, a mode selector 46, and a vehicle speed controller 48. The preceding vehicle determining section 40 can estimate a travel trajectory of the subject vehicle SV based on a yaw rate and vehicle speed, which are communicated from the yaw rate sensor 18 and the speed measuring device 20. In addition, the preceding vehicle determining section 40 can receive respective position and relative speeds for moving objects that are detected by the device 16, such as a preceding vehicle PV. With this information, the preceding vehicle determining section 40 determines that the preceding vehicle PV is the object, among the moving objects received from the object detecting device 16, which is located at the nearest position to the subject vehicle SV among the moving objects existing on the estimated travel trajectory of the subject vehicle SV.

The vehicle-to-vehicle distance controller 42 starts the vehicle-to-vehicle distance control in response to the selection of the vehicle-to-vehicle distance control by the mode selector 46. The vehicle-to-vehicle distance control mode for traveling in accordance with vehicle-to-vehicle control can include one of the following four travel modes: (1) travel as to maintain the set vehicle speed when there is no preceding vehicle (constant vehicle speed mode); (2) decelerate the vehicle speed so as to avoid approaching too much to the preceding vehicle PV when the speed of the preceding vehicle PV is slower than that of the subject vehicle SV (decelerating mode); (3) follow the preceding vehicle PV so as to maintain the set vehicle-to-vehicle distance regarding the preceding vehicle PV with the set vehicle speed as the highest allowable speed (following mode); and (4) gradually increase the vehicle speed up to the set vehicle speed when the preceding vehicle PV disappears in the situation where the subject vehicle SV follows the preceding vehicle PV with the slower speed than that of the preceding vehicle PV (accelerating mode).

In order to implement the above-mentioned travel modes, the vehicle-to-vehicle distance controller 42 calculates the target vehicle speed as follows:

(1) constant speed travel mode: the vehicle-to-vehicle distance controller 42 outputs the set vehicle speed as the target vehicle speed in response to the determination of no preceding vehicle PV by the preceding vehicle determining section 40;

(2) decelerating mode: the vehicle-to-vehicle distance controller 42 adjusts the target vehicle speed so as to decrease the current speed to the speed of the preceding vehicle PV when the vehicle-to-vehicle distance controller 42 determines that the preceding vehicle PV travels at a slower speed than that of the subject vehicle SV based on the relative speed of the preceding vehicle PV that has been received from the preceding vehicle determining section 40;

(3) following mode: the vehicle-to-vehicle distance controller 42 calculates the difference between the vehicle-to-vehicle distance received from the preceding vehicle determining section 40 and the set vehicle-to-vehicle distance received via the distance switch 34 and then calculates the target vehicle speed so as to make that difference zero; and (4) accelerating mode: the vehicle-to-vehicle distance controller 42 adjusts the target vehicle speed so as to increase the current speed up to the set vehicle speed in response to detection of no preceding vehicle PV when the subject vehicle SV follows the preceding vehicle PV with a slower speed than that of the preceding vehicle PV.

The vehicle-to-vehicle distance controller 42 can display the current operating state and the setting state of the ACC system on the output device 24, when the output device includes or is configured as a display. The vehicle-to-vehicle distance controller 42 can also activate a warning buzzer through the output device 24 (if so configured) when the driver's attention is needed, for example, in case of too closely approaching to the preceding vehicle PV.

In response to selection of the constant vehicle speed mode by the mode selector 46, the constant vehicle speed controller 44 outputs the set vehicle speed as the target vehicle speed to start the constant vehicle speed control. Thus, the constant vehicle speed control is performed so as to maintain the set vehicle speed whether any preceding vehicle PV may exist or not (this is a constant vehicle speed control mode). Upon starting the constant vehicle speed control, the constant vehicle speed controller 44 can display an indication on the output device 24 to indicate that the constant vehicle speed control is now underway.

The mode selector 46 selects either vehicle-to-vehicle distance control by the vehicle-to-vehicle distance controller 42 or constant vehicle speed control by the constant vehicle speed controller 44 in accordance with predetermined operations upon the input device 22, and particularly for example on the cruise switch 32. In response to predetermined operations upon the switch 32, the mode selector 46 further performs a switching to no-control states in which both the vehicle-to-vehicle distance control by the vehicle-to-vehicle distance controller 42 and the constant vehicle speed control by the constant vehicle speed controller 44 are disabled.

If a mode switching function is provided on the distance switch 34 instead of the cruise switch 32, the mode selector 46 switches between the vehicle-to-vehicle distance control by the vehicle-to-vehicle distance controller 42 and the constant vehicle speed control by the constant vehicle speed controller 44 in accordance with predetermined operations upon the distance switch 34. In this case, the switching of the vehicle-to-vehicle distance control and the constant vehicle speed control to no-control state is performed via the cruise switch 32.

The ACC controller 12 controls the vehicle speed of the subject vehicle SV based on the distance measured by the distance measuring device 16, the speed measured by the speed measuring device 20, and at least one of a target vehicle speed or a target distance inputted into the input device 22. In particular, the vehicle speed controller 48 controls the throttle actuator 28 so as to reach the target vehicle speed received from the vehicle-to-vehicle distance controller 42 in the vehicle-to-vehicle distance control mode and controls the throttle actuator 28 so as to reach the target vehicle speed (namely the set vehicle speed) received from the constant vehicle speed controller 44 in the constant vehicle speed control mode. If the deceleration achieved by the throttle control is not sufficient for the required vehicle speed, the vehicle speed controller 48 may operate the brakes by means of driving the brake actuator 26.

Of course, it is to be appreciated by those skilled in the art that the ACC system 10 of the illustrated embodiment is but one adaptive cruise control system that could be employed. Other ACC systems could also be used having varying configurations, though it is expected that such other ACC systems would include or communicate with a distance measuring device and a speed measuring device.

Figure 2:
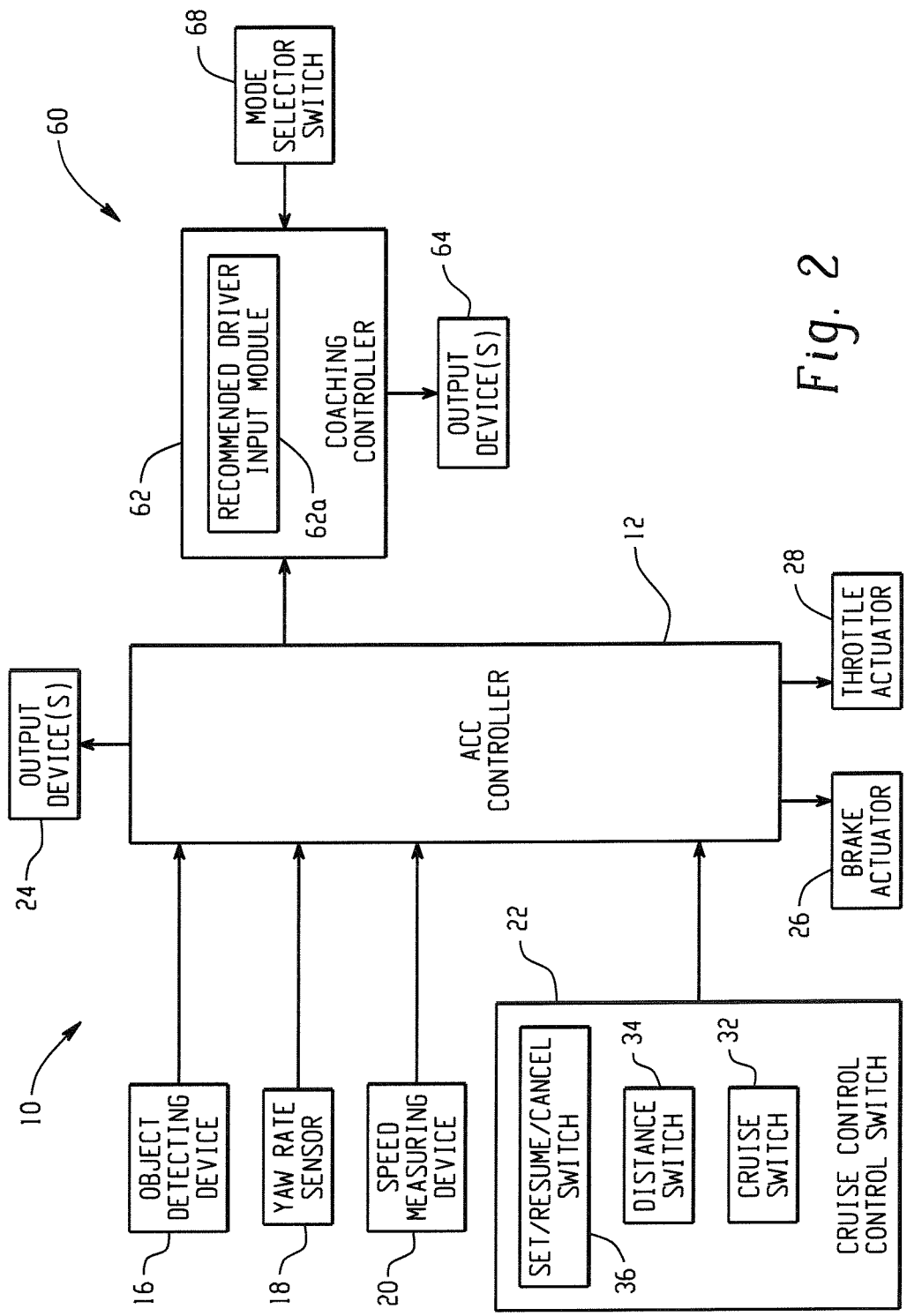
FIG. 2 is a block diagram schematically illustrating a driver coaching system for providing a recommended driver action during driving of a vehicle.

With reference now to FIG. 2, a driver coaching system 60 is illustrated for a vehicle, such as subject vehicle SV. As will be described in more detail below, the driver coaching system 60 can provide a recommended driver action during driving of the subject vehicle SV. In the illustrated embodiment, the driver coaching system 60 includes the adaptive cruise control system 10, which includes the object detecting or distance measuring device 16, the speed measuring device 20, and the input device 22, and the ACC controller 12, among other elements. In an exemplary embodiment, the driver coaching system 60 determines the recommended driver input or action based on the distance and speed as measured, respectively, by the devices 16, 20. The recommended driver input as determined by the driver coaching system 60 can also be based on the velocity of approach of the subject vehicle SV relative to the preceding vehicle PV as determined by the ACC controller 12. It is to be appreciated that alternate ACC systems could be used in the driver coaching system 60 and such alternate systems could include an object detecting or distance measuring device, a speed measuring device, an input device and an ACC controller.

The driver coaching system 60 of the illustrated embodiment further includes a coaching controller 62 communicating with each of the object detecting or distance measuring device 16 and the speed measuring device 20. In the illustrated embodiment, the coaching controller 62 communicates with the ACC system 10, particularly the ACC controller 12, for communicating with the object detecting or distance measuring device 16 and the speed measuring device 20. Alternatively, though not shown, the coaching controller 62 could communicate directly with the object detecting or distance measuring device 16 and/or the speed measuring device 20. As will be described in further detail below, the coaching controller 62 can be configured to determine a recommended driver input to optimize fuel economy based on the distance measured by the device 16 of the ACC system 10 and the speed measured by the device 20. The coaching controller 62 can be configured with a CPU, a RAM and a ROM and can include a recommended driver input module 62a for determining the recommended driver input.

Additionally, the driver coaching system 60 can include one or more output devices 64 mounted in the subject vehicle SV for communicating or relaying the recommended driver output as determined by the coaching controller 62 to a driver of the vehicle. The one more output devices 64 could be, for example, a display device for displaying messages thereon, a sound generating device for providing audible sounds or warnings, light indicators, etc, or a combination of such devices. In one exemplary embodiment, the output device 64 is a display device, such as an LCD monitor, that communicates the recommended driver input as determined by the coaching controller 62 by displaying a message or messages thereon.

The recommended driver input determined by the coaching controller 62 can be at least one of a braking notification or an acceleration notification. For example, the recommended driver input can be a braking notification that includes a recommended degree of braking between a minimum braking amount and a maximum braking amount. The recommended driver input can also be an acceleration notification that includes a recommended degree of acceleration between a minimum acceleration amount and a maximum acceleration amount. The braking notification and/or the acceleration notification can be determined by the coaching controller 62 so as, provided they are followed, to optimize fuel economy of the subject vehicle SV. For indicating a degree of braking or a degree of acceleration between minimum and maximum amounts, particular messages could be provided that are tailored to the degree of braking or acceleration recommended. Alternatively, visual indicators could be provided on the output device 64 that are indicative of a degree between a minimum and maximum amount. In any case, the recommended driver input determined by the coaching controller 62 and relayed to the driver by the output device 64 can be an indication that a certain degree of braking is needed or an indication that a certain degree of acceleration is needed, both to optimized fuel economy of the subject vehicle SV.

The driver coaching system 60 of the illustrated embodiment can further include a mode selector switch 68 that allows for the selection of a selected mode from at least a first mode and a second mode, though the mode selector switch 68 is not required. When the mode selector switch 68 is included, the coaching controller 62 can be further configured to determine the recommended driver input based on the selected mode of the mode selector switch 68. By way of example, the first mode can be an economy mode having a higher level of sensitivity corresponding to a higher level of fuel economy optimization than the second mode. In this case, the recommended driver input determined by the coaching controller 62 can be more gradual and/or timely for the first mode (i.e., the economy mode) than for the second mode. For example, braking notifications can be provided earlier and/or the recommended degree of braking can be reduced accordingly so the recommended driver input, if followed, decelerates the vehicle more slowly in the first mode. Similarly, acceleration notifications can be provided earlier and/or the recommended degree of acceleration can be reduced so the recommended driver input, if followed, accelerates the vehicle more slowly. By contrast, the second mode may not provide notifications as early as the first mode and/or may provide greater recommended degrees of braking and/or acceleration.

Advantageously, the coaching controller 62 can determine the recommended driver input and the output device 64 can relay the determined recommended driver input regardless of whether the ACC system 10 is on or off. Accordingly, the coaching controller 62 can determine the recommended driver input regardless of the state of the on/off switch for the ACC system 10, which in the illustrated embodiment is the input device 22, particularly the cruise switch 32 thereof. Accordingly, the coaching controller 62 can make use of the object detecting or distance measuring device 16 and the speed measuring device 20 irrespective of whether the ACC system 10 is on and actuated.

Figure 3:
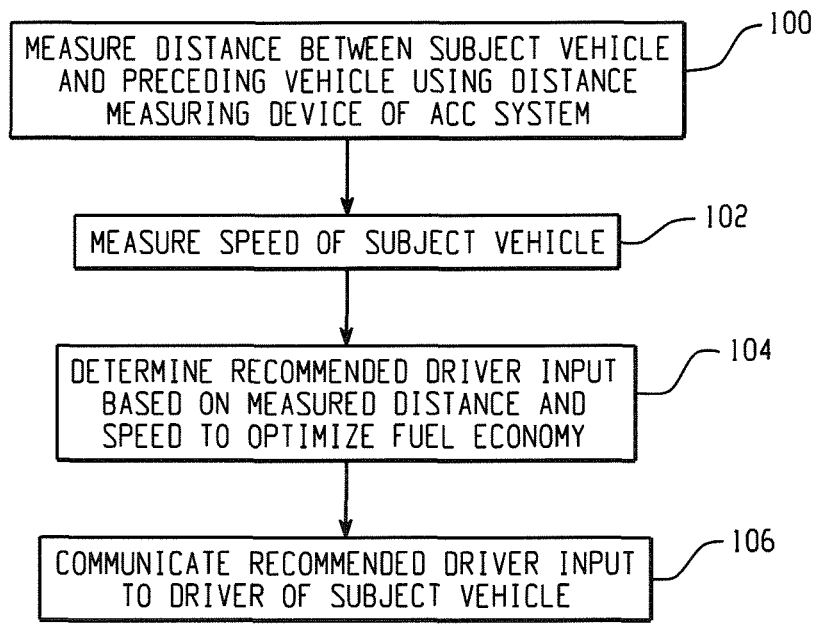
FIG. 3 is a flowchart illustrating a vehicle driver coaching method.

With reference now to FIG. 3, a vehicle driver coaching method will be described. The vehicle driver coaching method of FIG. 3 can be performed via the driver coaching system 60 described herein and will be described with particular reference thereto, though this is not required. In 100, a distance is measured between the subject vehicle SV and the preceding vehicle PV using the object detecting or distance measuring device 16 of the ACC system 10. In 102, a speed of the subject vehicle SV is measured. This can be done using the speed measuring device 20 of the ACC system 10. In 104, a recommended driver input is determined by the coaching controller 62 to optimize fuel economy based on the distance measured by the device 16 of the ACC system 10 in 100 and the speed measured by the speed measuring device 20 of the ACC system 10 in 102. Optionally, a velocity of approach of the subject vehicle SV relative to the preceding vehicle PV can be determined in the illustrated method of FIG. 3 and, when so determined, the recommended driver input as determined by the coaching controller 62 in 104 can also be based on the determined velocity of approach.

The recommended driver input as determined by the coaching controller 62 in 104 can be communicated in 106 to a driver of the subject vehicle SV. Such communication can occur by the coaching controller 62 commanding the output device 64 to display or otherwise indicate the recommended driver input as determined by the coaching controller 62. For example, communicating the recommended driver input in 106 can include displaying the recommended driver input in the subject vehicle SV on the output device 64, which can be a monitor, such as an LCD monitor. As mentioned, the recommended driver input as determined by the coaching controller 62 can be at least one of a braking notification or an acceleration notification. When a braking notification is provided, the notification can include a degree of braking, and, when an acceleration notification is provided, the notification can include a degree of acceleration.

Figure 4:
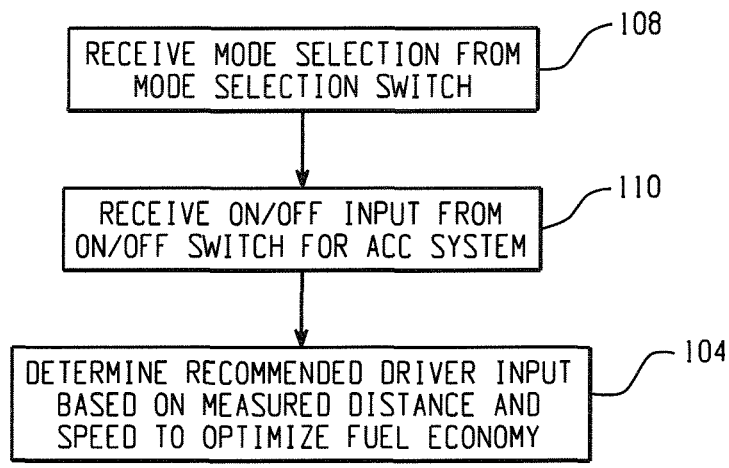
FIG. 4 is a flowchart illustrating optional steps for the method of FIG. 3.

With reference to FIG. 4, additional steps are illustrated that can be included within the method of FIG. 3. In particular, in 108, a mode selection can be received by the coaching controller 62 from the mode selection switch 68. As already indicated, the mode selection can be a selected mode from at least one of a first mode and a second mode. When a mode selection is received, determining the recommended driver input in 104 based on the measured distance and speed to optimize fuel economy can also be based on the selected mode. The first and second modes can correspond to difference levels of fuel economy optimization. For example, the first mode can correspond to a higher level of fuel economy optimization than the second mode.

In addition or in the alternative to 108, on/off input can be received in 110 from the cruise switch 32 of the ACC system 10, which can be used to turn the ACC system 10 on and off. Determining the recommended driver input in 104 and communicating the recommended driver input in 106 can occur when the on/off input from the cruise switch 32 turns the ACC system 10 on or off. In other words, the ACC system 10 need not be on for the coaching controller 62 to function and use the devices 16 and 20.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A driver coaching system for a vehicle, comprising:
an adaptive cruise control (ACC) system for automatically controlling a vehicle speed of the vehicle, said ACC system including:
a distance measuring device for measuring a distance between the vehicle and a preceding vehicle,
a speed measuring device for measuring a speed of the vehicle,
an input device for inputting at least one of a target vehicle speed or a target distance,
an ACC controller that controls the vehicle speed of the vehicle based on the distance measured by the distance measuring device, the speed measured by the speed measuring device and the at least one of the target vehicle speed or the target distance inputted into the input device;
a coaching controller communicating with the ACC system, the coaching controller configured to determine a recommended driver input to optimize fuel economy based on the distance measured by the distance measuring device of the ACC system and the speed measured by the speed measuring device, wherein the recommended driver input is a braking notification that includes a recommended degree of braking between a minimum braking amount and a maximum braking amount or an acceleration notification that includes a recommended degree of acceleration between a minimum acceleration amount and a maximum acceleration amount; and an output device for communicating the recommended driver input to a driver of the vehicle.

2. The driver coaching system of claim 1 wherein the output device is a display device that communicates the recommended driver input by displaying a message.

3. The driver coaching system of claim 1 wherein said ACC system further includes an on/off switch for turning the ACC system on and off, said coaching controller determining the recommended driver input regardless of a state of the on/off switch.

4. The driver coaching system of claim 1 further including:
a mode switch for selecting a selected mode from at least a first mode and a second mode, said coaching controller further configured to determine the recommended driver input based on the selected mode of the mode switch.

5. The driver coaching system of claim 4 wherein the first mode is an economy mode having a higher level of sensitivity corresponding to a higher level of fuel economy optimization than the second mode, the recommended driver input determined by the coaching controller being more gradual and timely for the first mode than for the second mode.

6. The driver coaching system of claim 1 wherein the ACC controller determines a velocity of approach of the vehicle relative to the preceding vehicle and the recommend driver input is based on the velocity of approach determined by the ACC controller.

7. A vehicle driver coaching method, comprising:
measuring a distance between a subject vehicle and a preceding vehicle using a distance measuring device of an adaptive cruise control (ACC) system;
measuring a speed of the subject vehicle;
determining a recommended driver input to optimize fuel economy based on the distance measured by the measuring device of the ACC system and the speed measured, wherein the recommended driver input is a braking notification that includes a degree of braking to optimize fuel economy; and
communicating the recommended driver input to a driver of the subject vehicle.

8. The method of claim 7 wherein the recommended driver input further includes an acceleration notification.

9. The method of claim 8 wherein the acceleration notification includes a degree of acceleration.

10. The method of claim 7 wherein communicating the recommended driver input includes displaying the recommended driver input in the subject vehicle.

11. The method of claim 7 further including:
receiving a mode selection from a mode selection switch, said mode selection being a selected mode from at least one of a first mode and a second mode, wherein determining the recommended driver input is also based on the selected mode.

12. The method of claim 11 wherein the first mode corresponds to a higher level of fuel economy optimization than the second mode.

13. The method of claim 7 further including:
receiving on/off input from an on/off switch for turning the ACC system on and off, wherein determining the recommended driver input and communicating the recommended driver input occurs when the on/off input turns the ACC system on or off.

14. The method of claim 7 further including:
determining a velocity of approach of the subject vehicle relative to the preceding vehicle, wherein determining the recommended driver input is also based on the velocity of approach.

15. A driver coaching system for providing a recommended driver action during driving of a subject vehicle, comprising:
a distance measuring device of an adaptive cruise control (ACC) system for measuring a distance between the subject vehicle and a preceding vehicle;
a speed measuring device for measuring a speed of the subject vehicle;
a coaching controller communicating with each of the distance measuring device and the speed measuring device, the coaching controller determining a recommended driver input based on the distance and speed as measured, respectively by the distance measuring device and the speed measuring device, wherein the recommended driver input indicates a certain braking degree within a braking range is needed or a certain acceleration degree within an acceleration range is needed to optimize fuel economy of the subject vehicle; and
an output device mounted in the subject vehicle and relaying the recommended driver input.

16. The driver coaching system of claim 15 wherein the coaching controller determines the recommended driver input and the output device relays the recommended driver input regardless of whether the ACC system is on or off.

17. The driver coaching system of claim 15 wherein the braking range includes braking degrees between a minimum and a maximum braking amount and the acceleration range includes acceleration degrees between a minimum and a maximum acceleration amount.

* * * * *